United States Patent [19]

Whiteside

[11] 4,184,760
[45] Jan. 22, 1980

[54] SCANNING SHUTTER BLADE ARRANGEMENT WITH INERTIAL WHEEL

[75] Inventor: George D. Whiteside, Lexington, Mass.

[73] Assignee: Polaroid Corporation, Cambridge, Mass.

[21] Appl. No.: 10,071

[22] Filed: Feb. 7, 1979

Related U.S. Application Data

[63] Continuation-in-part of Ser. No. 850,792, Nov. 11, 1977, abandoned.

[51] Int. Cl.² .............................. G03B 9/08; G03B 9/58
[52] U.S. Cl. ........................................ 354/230; 354/256
[58] Field of Search .................................... 354/26–28, 354/230, 256, 258, 260

[56] References Cited

U.S. PATENT DOCUMENTS

| | | | |
|---|---|---|---|
| 3,187,655 | 6/1965 | Kiper | 354/256 |
| 3,645,185 | 2/1972 | Kitai | 354/258 |
| 3,772,392 | 3/1973 | Kitai | 354/26 |
| 3,856,393 | 12/1974 | Ogihara et al. | 354/258 |
| 3,873,987 | 3/1975 | Brauning et al. | 354/26 |
| 3,942,183 | 3/1976 | Whiteside | 354/29 |
| 3,969,738 | 7/1976 | Johnson et al. | 354/230 |
| 3,969,739 | 7/1976 | Johnson et al. | 354/230 |
| 4,047,192 | 9/1977 | Johnson et al. | 354/83 |

Primary Examiner—L. T. Hix
Assistant Examiner—Thomas H. Tarcza
Attorney, Agent, or Firm—Edward S. Roman

[57] ABSTRACT

In a photographic camera apparatus, there is provided an exposure control system of the type embodying "scanning" shutter blade elements in which the opening shutter blade movement is slowed by way of an inertial wheel which is rotated in concert with the shutter blade mounting member or walking beam. During the closing movement of the shutter blade elements, the walking beam disengages from the inertial wheel to facilitate a fast shutter blade closing movement substantially unrestricted by the inertial wheel.

11 Claims, 4 Drawing Figures

SCANNING SHUTTER BLADE ARRANGEMENT WITH INERTIAL WHEEL

CROSS REFERENCE TO RELATED PATENT APPLICATION

This application is a continuation-in-part to U.S. patent application Ser. No. 850,792 now abandoned, entitled "Scanning Shutter Blade Arrangement with Inertial Wheel", by George D. Whiteside, filed Nov. 11, 1977 in common assignment herewith.

BACKGROUND OF THE INVENTION

1. Field of the Invention

This invention relates generally to an exposure control system with an inertial wheel for controlling the opening movement of the shutter blade elements in a photographic apparatus, and more particularly, to an exposure control system with "scanning type" shutter blade elements in which the opening rate of movement of the blades is slowed by way of an inertial wheel while the closing rate of movement remains substantially unaffected.

2. Description of the Prior Art

Exposure control systems for photographic camera apparatus generally embody lightweight shutter blade elements with scene light admitting apertures therethrough. The shutter blade elements may be moved in directions which operate to progressively enlarge and decrease the effective scene light admitting aperture. The rate at which the shutter blade elements are moved determines the rate at which the effective aperture increases and decreases and has a direct influence on the achievable depth of field. Thus, in order to increase the depth of field, it may be desirable to slow the speed of the shutter blade elements as they are moved in the direction of progressively increasing effective aperture size. Shutter blade elements are often moved toward the opening position through the influence of a biasing spring, the output force characteristic of which controls the speed at which the shutter blade elements move. For exposure control systems embodying lightweight shutter blade elements, as well as other moving components, it may be necessary to utilize a substantially light biasing spring to achieve the desired slow rate of blade opening. However, in such a lightweight exposure control system of the above described type, where the actuating force is small, the frictional forces between moving components becomes a significant part of the overall force which must be overcome by the biasing means. These frictional forces also tend to vary with shutter blade movement and thus may cause a jerking movement of the shutter blades which is highly undesirable. An increase in the output force characteristic of the biasing spring by itself may make the opening movement of the shutter blade elements less sensitive to frictional force variations; however, the increased shutter blade speed will also limit the depth of field which could otherwise be achieved.

One means of slowing the opening shutter blade speed without increasing the weight of the exposure control components is disclosed in a U.S. Pat. No. 3,969,738 entitled "Exposure Control System with Inertia Characteristic", by B. Johnson et al. issued July 13, 1976 in common assignment herewith, which discloses an exposure control system of the type embodying "scanning type" shutter blade elements wherein means are included for selectively presenting a relatively high inertial characteristic to the shutter blade elements as they are moved toward their maximum scene light admitting position. The inertial characteristic is presented by means of an inertial member disposed of copivotal movement with respect to the shutter blade mounting member or walking beam. Thus, the inertial characteristic imparted to the opening shutter blade elements is determined by the weight of the inertial member. Another such inertial exposure control system embodying an inertial member copivotally disposed with the walking beam is disclosed in U.S. Pat. No. 3,969,739 entitled "Exposure Control System with Selectively Presentable Inertia Member", by B. Johnson et al., issued July 13, 1976 in common assignment herewith. Wherein such inertial members operate in a satisfactory manner for the purposes in which they were intended, it may be desirable to slow the opening shutter blade movement even more, particularly for cameras of the non-focusing type where an increased depth of field is particularly desirable. It may not be possible to achieve the desired slow rate of opening blade movement solely by increasing the size and weight of the aforementioned inertial members and still maintain a compact photographic camera structure.

Therefore, it is an object of this invention to provide an exposure camera system embodying "scanning type" shutter blade elements wherein the opening movement of the shutter blades may be slowed to a greater extent than was heretofore possible to provide an increased depth of field without materially increasing the size of the exposure control system.

It is another object of this invention to provide an exposure control system having "scanning type" shutter blade elements where means are provided to increase the inertial characteristic of the shutter blade elements during their opening movement so as to slow the shutter blade elements and effect a corresponding increase in the depth of field in a simple and economical manner.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera apparatus of the type including means for mounting photographic film material at a given focal plane also includes a blade mechanism. Means are provided for mounting the blade mechanism for displacement between a first arrangement where it precludes scene light from reaching the film plane and a second arrangement wherein it defines a maximum size aperture. The blade mechanism serves to define a range of progressively increasing sized apertures for admitting scene light to the film plane as it is moved from its first arrangement to its second arrangement. The mounting means additionally includes a mounting member pivotally disposed for rotation about a first axis. The mounting member also connects to the blade mechanism so as to pivot in a first direction when the blade mechanism is moved from its first arrangement toward its second arrangement and to pivot in a second direction opposite to the first direction when the blade mechanism is moved from its second arrangement back towards its first arrangement. Selectively actuable drive means are provided for moving the mounting member and the blade mechanism between its first and second arrangements.

An inertial member is disposed for rotation about a second axis parallel to the first axis and includes a portion engageable by the mounting member so as to be rotated from an initial position by the mounting member as the mounting member rotates in its first direction thereby imparting a slower aperture movement to the blade mechanism than would otherwise occur as the blade mechanism is moved from its first arrangement toward its second arrangement by the drive means. The inertial member is further configured not to engage the mounting member as the mounting member is rotated in its second direction thereby accommodating aperture closing movement of the blade mechanism by the drive means substantially unrestricted by the inertial characteristic of the inertial member. A spring element is arranged to be engaged in a tightened condition solely by the inertial member as the mounting member is moved in its first direction in order not to influence the aperture opening movement of the blade mechanism as the blade mechanism is moved from its first arrangement toward its second arrangement by the drive means. The spring element has one end thereof disposed in position to be engaged by the mounting member as the mounting member is moved in its second direction so as to be further tightened by the mounting member to thereby rotate the inertial member back to its initial position after the blade mechanism is returned to its first arrangement by the drive means.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF THE PREFERRED EMBODIMENT

Figure 1:
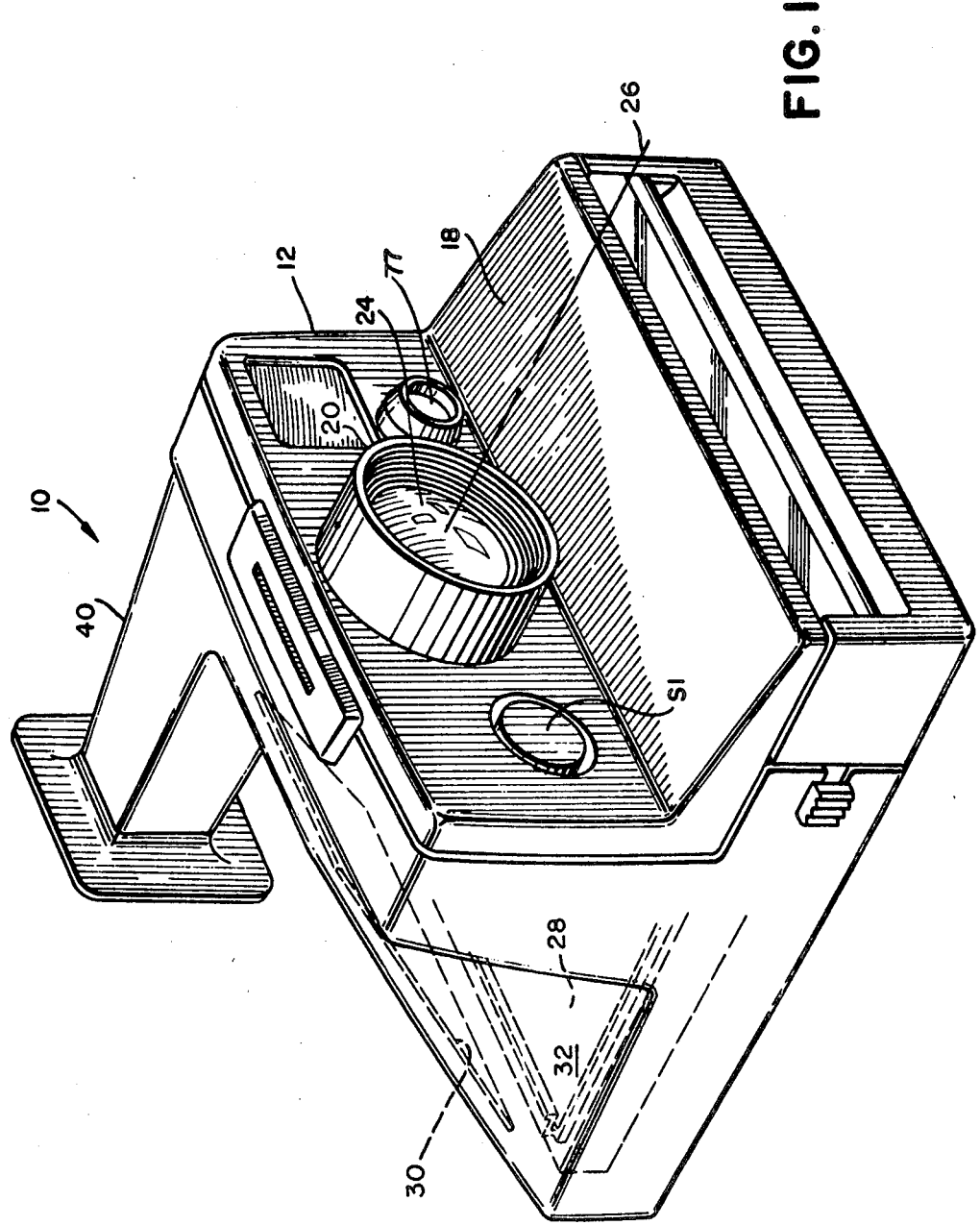
FIG. 1 is a perspective view of a camera apparatus embodying the inertially influenced exposure control system of this invention.
Figure 2:
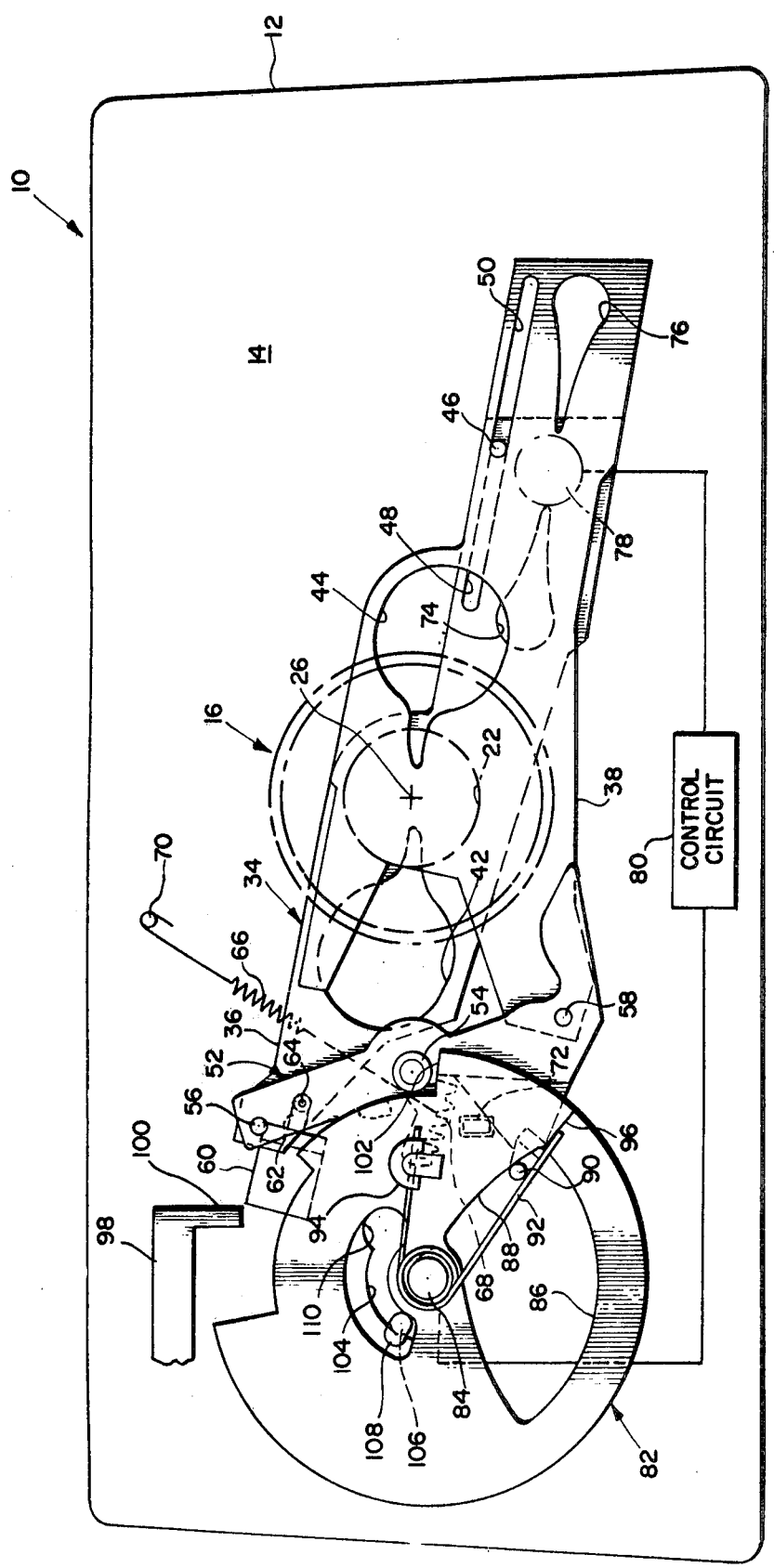
FIG. 2 is a cross-sectional front view of the exposure control system of this invention.

Referring now to FIGS. 1 and 2, it can be seen that the exposure control system of this invention may be associated with a photographic camera apparatus 10 contained within a housing 12. A base block casting 14 is fixedly stationed within the housing 12 and selectively machined to support the various components of the exposure control apparatus as shown generally at 16. Surrounding the front and top of the base block casting 14, there is provided a cover section 18 which includes at least one opening through which extends a cylindrical lens mount 20 which is preferably of the non-variable focus type. Centrally disposed within the base block casing 14, there is provided a light entering exposure opening 22 which defines the maximum available exposure aperture for the system.

An objective or taking lens 24 is provided in overlying relation to the light entry opening 22 wherein the objective lens 24 may comprise either a single element or a plurality of elements retained in predetermined spaced relation by the cylindrical lens mount 20. As is readily apparent, the objective lens 24 provides a central optical axis 26 illustrated in FIG. 2 as being normal to the plane of the drawing. Thus, objective lens 24 focuses image carrying rays through the light entry exposure opening 22 to a rearwardly positioned film or focal plane 28 by way of a reflecting mirror 30 all of which are stationed within a suitable lighttight film exposure chamber 32 within the housing 12.

Intermediate the objective lens 24 and the light entry exposure opening 22, there is supported a blade mechanism 34 comprising two overlapping shutter blade elements 36 and 38 which will be subsequently described in greater detail herein. Extending from the front cover 18 there is provided a photographic cycle initiating button $S_1$, the depression of which, commences the exposure interval by ultimately effecting release of the shutter blade elements 36 and 38. In addition, there is provided a viewfinder as shown generally at 40 which enables a photographer to properly frame and compose a desired scene to be photographed.

A pair of scene light admitting primary apertures 42 and 44 are provided respectively in the blade elements 36 and 38. Means are provided for mounting the shutter blade elements 36 and 38 for displacement along a predetermined path between a first arrangement (see FIG. 2) wherein the shutter blade elements 36 and 38 preclude scene light from reaching the film plane 28 and a second arrangement (see FIG. 3) wherein the primary apertures 42 and 44 overlap to cooperatively define a maximum size effective primary aperture to admit scene light to the film plane 28. The blade mechanism mounting means comprises a pivot pin or stud 46 projecting outwardly from the base block casting 14 at a location spaced laterally apart from the light entry exposure opening 22 so as to pivotally and translatably engage a pair of elongated slots 48 and 50 formed in respective shutter blade elements 36 and 38. Pin 46 may be integrally formed with the base block casting 14 and blade elements 36 and 38 may be retained in engaging relation with respect to the pin 46 by any suitable means such as peening over the end of the pin 48.

Means for mounting the blade mechanism additionally include a mounting member or walking beam 52 pivotally connected to respective extended portions from each shutter blade element 36 and 38. The walking beam 54, in turn, is disposed for rotation relative to the base block casting 14 by pivotal connecting to a projecting pin or stud 54 which may be integrally formed with the base block casting 14 at a location spaced laterally apart from the light entry exposure opening 22. The walking beam 52 may be pivotally retained with respect to the pin 54 by any conventional means such as an E-ring (not shown). In the preferred mode, the walking beam 54 is pivotally connected at its distal ends to the shutter blade elements 36 and 38 by respective pin members 56 and 58 which extend laterally outward from the walking beam 52. Thus, clockwise rotation of the walking beam 52 operates to move the shutter blade elements 36 and 38 in directions which progressively enlarge the effective primary aperture cooperatively defined by the overlapping apertures 42 and 44 over the light entry exposure opening 22 thereby defining a range of progressively increasing sized effective primary apertures for admitting scene light to the film plane 28. Such blade movement is more fully described in U.S. Pat. No. 3,942,183 entitled "Camera with Pivoting Blades" by George Whiteside issued Mar. 2, 1976. Although as is readily apparent, rotation of walking beam 52 about its pivot point 54 effects simultaneous linear and angular displacement of shutter blade elements 36 and 38 about pivot pin 46, such angular displacement is minimal and the motion of the shutter blade elements 36 and 38 will hereinafter be described as being generally rectilinear.

Figure 3:
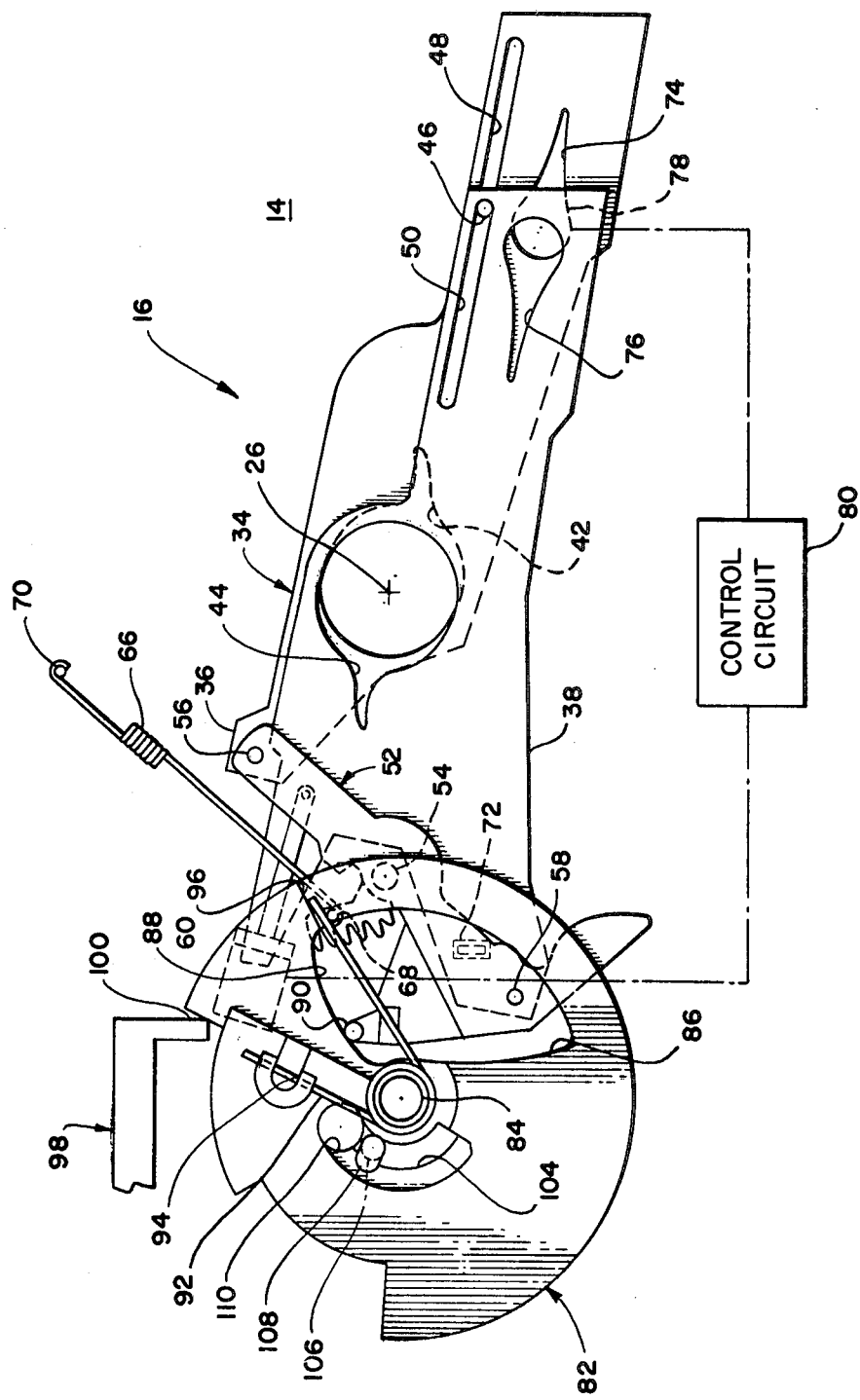
FIG. 3 is a cross-sectional front view of the exposure control system of FIG. 2 in a different mode of operation.

Selectively actuable drive means are provided for initially displacing the blade mechanism from its scene light blocking first arrangement as shown in FIG. 2 toward its scene light admitting second arrangement as shown in FIG. 3 and thereafter displacing the blade mechanism back to its initial scene light blocking first arrangement in response to the film being suitably exposed to define an exposure cycle. Such drive means comprise a tractive electromagnetic device in the form of a solenoid 60 which is employed to rotate the walking beam 52 in a counterclockwise direction thereby displacing the shutter blade elements 36 and 38 from their scene light admitting second arrangement back to their scene light blocking first arrangement. Solenoid 60 includes an internally disposed, cylindrical plunger unit 62 which retracts inwardly to the body of the solenoid upon energization of the solenoid coil or winding. The solenoid plunger 62 may be affixed to the walking beam 52 by means of a pivot pin or stud 64, such that longitudinal displacement of the plunger 62 will operate to rotate the walking beam around the pivot pin 54 so as to appropriately displace the shutter blades 36 and 38.

The selectively actuable drive means further include a biasing tension spring 66 which operates to continuously urge the walking beam 52 and its associated shutter elements 36 and 38 toward their scene light admitting second arrangement which defines the largest effective primary aperture over the light entry opening 22. A movable end of tension spring 66 is attached to the walking beam 52 at 68 while the stationary end of tension spring 66 is grounded with respect to the base block casting 14 at pin 70. Thus, with the spring connection herein described, the exposure control system of this invention is biased to continuously urge the shutter blade elements 36 and 38 to move from their scene light blocking first arrangement as shown in FIG. 2 toward their maximum effective aperture defining second arrangement as shown in FIG. 3.

In the present arrangement, the shutter blades 36 and 38 are drawn from their second arrangement back toward their first arrangement against the yieldable bias of the drive spring 66 when the solenoid 60 is energized. Consequently, energization of the solenoid 60 prevents the shutter blade elements 36 and 38 from moving toward their maximum effective primary aperture defining position (second arrangement of FIG. 3) under the urging influence of spring 66. However, as should be readily understood, the exposure control system of this invention will be equally applicable to photographic systems where the blades 36 and 38 are spring biased in a normally closed position.

Continued energization of the solenoid 60 in order to maintain the shutter blade elements 36 and 38 in their closed position (first arrangement of FIG. 2) may result in an undesirable drain in the camera apparatus power source which preferably is an electrical storage battery housed within the film cassette in a well known manner. Thus, a mechanical latch as shown generally at 72 in FIGS. 2 through 4 may be provided to move into lateral engagement with an edge of the walking beam 52 so as to maintain the blade elements 36 and 38 in their closed first arrangement regardless of the energization of solenoid 60. As should be readily apparent, the latch 72 releases the walking beam 52 by moving in a direction perpendicular to the plane of the drawings in response to the manual actuation of the photographic cycle initiating button $S_1$. Additional information regarding the structure and operation of the latch 72 is described in U.S. Pat. No. 4,047,192 entitled "Photographic Apparatus With Sequencing System" by B. K. Johnson, D. Van Allen, and G. D. Whiteside, issued Sept. 6, 1977 in common assignment herewith.

Means are cooperatively associated with the blade mechanism 34 and its mounting means for detecting scene light during an exposure cycle. Such scene light detecting means comprise a pair of photocell sweep secondary apertures 74 and 76 of respective shutter blade elements 36 and 38. The photocell sweep secondary apertures 74 and 76 are aligned to transmit scene light received from an opening 77 in the cover section 18 of housing 12 to a photoresponsive element 78 stationed behind the photocell sweep secondary apertures in correspondence with the scene light admitted to the film plane 28 by the primary apertures 42 and 44. The photoresponsive element 78 may be a photovoltaic cell type generating an output signal in correspondence with the levels of scene light intensity incident thereon. The photoresponsive element 78 is coupled to a light integrating and control circuit 80 which may include an operational amplifier having a feedback path comprising an integrating capacitor connected in a well known manner for providing a linear output signal corresponding to the time integration of the scene light intensity incident to the photoresponsive element 78. The light integrating control circuit 80, in turn, is connected to the solenoid 60 in order to energize the solenoid in correspondence to the film receiving sufficient scene light corresponding to a select exposure value.

An inertial wheel or disc 82 is disposed for rotation about a pivot pin or stud 84 extending outward from the base block casting 14 in spaced apart parallel relation with respect to the walking beam pivot pin 4. The inertial wheel 82 includes a cutaway portion 86 having one edge which defines a generally radially extending cam surface 88 which is slidingly engaged by a pin 90 from the walking beam 52 in a manner to be subsequently described in greater detail herein. A torsion spring 92 configured to operate in a compression mode is disposed in a tightened or tensioned condition for general coaxial rotation with respect to the inertial wheel 82 with one radially extending leg portion engaged to a stop member 94 on the inertial wheel 82 and the other radially extending leg portion engaged to a raised edge surface 96 on the inertial wheel 82 as shown in FIG. 2.

A stop member 98 having an abutment surface 100 is provided in fixed connection with respect to the base block casting 14 with the abutment surface 100 extending into the locus of rotation of a radially extending edge portion 102 of the inertial wheel 82 so as to engage and stop the inertial wheel 82 at a select location corresponding to the second arrangement of the blade mechanism as shown in FIG. 3.

The inertial wheel 82 additionally includes an arcuate slot 104 through which extends a projection 106 from the base block casting 14 terminating in a tab 108 which overlaps the edges of the arcuate slot 104 in order to inhibit axial movement of the inertial wheel 82 along the axis of the pivot pin 84. The arcuate slot 104 may additionally include a widened portion 110 at one end thereof to accommodate the insertion of the tab portion 108 therethrough during the assembly thereof. Thus, during assembly, the inertial wheel 82 is inserted over the pivot pin 84 at the same time that the tab portion 108 is inserted through the widened portion 110 of the arcuate slot 104. The stop member 98 may then be affixed to the base block casting 14 so as to thereafter limit rotation of the inertial wheel 82 in a manner prohibiting the tab portion 108 from again overlapping the widened portion 110 of the arcuate slot 104 during normal operation of the camera apparatus.

The exposure control system is herein described in relation to a photographic camera of the non-single lens type although the intended scope of the invention is by no means so limited and cameras of the well known reflex type as described in U.S. Pat. No. 3,672,281 entitled "Reflex Camera" by E. H. Land may be equally suitable for incorporating the exposure control system of this invention.

A photographic exposure cycle may be commenced upon the depression of the photographic cycle initiating button $S_1$ which operates in the aforementioned manner to retract the mechanical latch 72 out of engagement with edge of the walking beam 52. The walking beam 52 is thereafter rotated in a clockwise direction as viewed from FIGS. 2 through 4 by the drive spring 66 to move the shutter blade elements 36 and 38 in opposing directions so that the primary apertures 36 and 38 overlap to cooperatively define a range of progressively increasing sized effective primary apertures for admitting scene light to the film plane 28 as the blades move from their scene light blocking first arrangement to their scene light admitting second arrangement. Upon clockwise rotation of the walking beam 52, the pin 90 engages the cam surface 88 of the inertial wheel 82 so as to rotate the inertial wheel 82 in a counterclockwise direction about its pivot pin 84 in concert with the walking beam 52. In this manner, the inertial wheel 82 imparts a slower aperture opening movement to the blade mechanism 34 than would otherwise occur. In addition, it will be readily apparent that the torsion spring 92 despite its tightened condition has absolutely no influence in determining the opening inertial of the blade mechanism 34 since one leg of the spring 92 is engaged by the stop member 94 while the other leg is engaged by the raised edge surface 96 of the inertial wheel 82. Thus, the torsion spring 92 is carried entirely by the inertial wheel 82 in a tightened state during the opening movement of the blade mechanism 34. As is readily apparent, the drive pin 90 moves along the cam surface 88 radially inward away from the torsion spring 92 and toward the inertial wheel pivot pin 84 so as to continuously vary the inertial characteristic imparted to the blade mechanism 34 as it is moved from its first arrangement in FIG. 2 toward its second arrangement of FIG. 3. Engagement of the radially extending edge portion 102 of the inertial wheel 82 against the stop member abutment surface 102 operates to ultimately terminate the opening movement of the blade mechanism 34 at its second arrangement as shown in FIG. 2.

Figure 4:
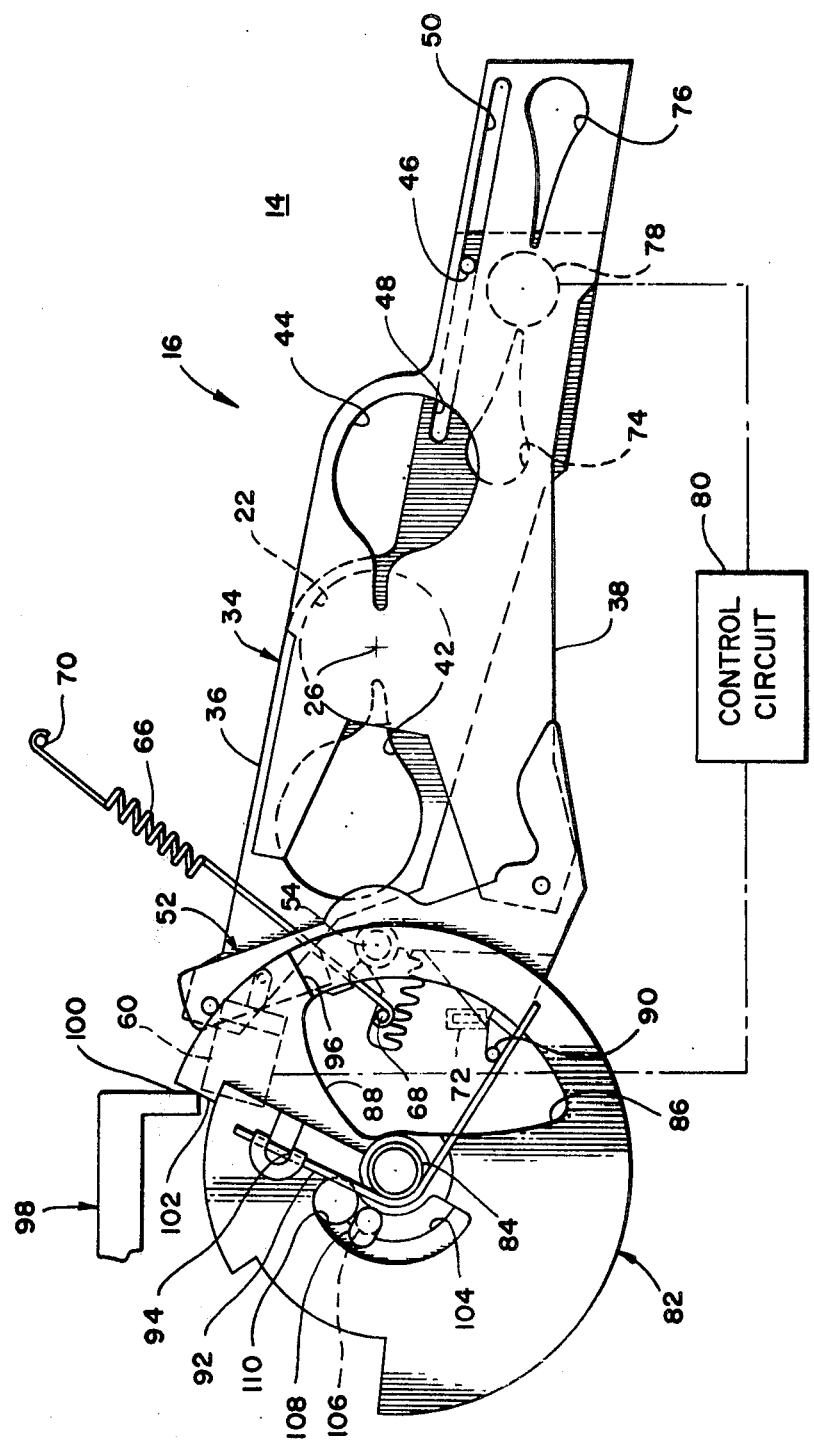
FIG. 4 is a cross-sectional front view of the exposure control system of FIG. 2 in still another mode of its operation.

The photocell sweep secondary apertures 74 and 76 simultaneously define a progressively enlarging effective aperture opening over the photoresponsive element 78 so as to admit scene light thereto in correspondence with the scene light admitted to the film plane 28. When an appropriate amount of light is received to trigger the control circuit 80, solenoid 60 is energized to rotate the walking beam 52 in a counterclockwise direction so as to draw the shutter blade elements 36 and 38 from their scene light admitting second arrangement back to their scene light blocking first arrangement as shown in FIG. 4.

During the aforementioned return movement of the blade mechanism 34, the drive pin 90 engages the underlying leg of the torsion spring 92 so as to rotate it in a counterclockwise direction away from the raised edge surface 96 of the inertial member 82 thereby further tightening the torsion spring 92 in a manner ultimately operating to drive the inertial wheel 82 in a clockwise direction about its pivot pin 84 back to its initial position as shown in FIG. 2. In the preferred mode of operation the blade mechanism 34 is driven by the walking beam 52 back to its first scene light blocking arrangement as shown in FIG. 3 before the torsion spring 92 is sufficiently tightened to overcome the inertia of the wheel 82 and initiate rotation thereof in a clockwise direction back toward its initial position as shown in FIG. 2. It will be readily appreciated that the closing force exerted by the solenoid 60 is so large in comparison to the maximum force exerted by the torsion spring 92 that the blade mechanism 34 is closed in a manner substantially unrestricted by the torsion spring 92 as it tightens.

In this manner the shutter blade elements 36 and 38 may be moved from their first scene light blocking arrangement toward their second scene light unblocking arrangement at a slowed controlled rate of movement determined solely by the inertial characteristic imparted to the blade mechanism 34 by the inertial wheel 82 without any influence from the return torsion spring 92 despite its tightened condition. The shutter blade elements 36 and 38 may also be quickly returned from their second scene light unblocking arrangement back to their first scene light blocking arrangement without the inertia characteristic provided by the wheel 82 during its opening movement and substantially unrestricted by the torsion spring 92 as it further tightens. Inertial wheel 82 is thereafter returned to its initial position by way of the torsion spring 92 subsequent to the blade mechanism reaching its first scene light blocking arrangement. As is also readily apparent, the radial sliding movement of the walking beam drive pin 90 also the radial cam surface 88 provides for a varying mechanical advantage to change the inertia characteristic applied by the inertial wheel 82 to the blade mechanism in correspondence with varying opening blade movement which can be utilized to achieve a select exposure control.

This invention may be embodied in other specific forms such as cameras having variable focus objective lenses without departing from the spirit and essential characteristics thereof. The present embodiments are therefore to be considered in all respects as illustrative and not restrictive, the scope of the invention being indicated by the appended claims rather than the foregoing description, and all changes which come within the meaning and range of the claims are therefore intended to be embraced therein.

What is claimed is:

1. A photographic camera apparatus including means for mounting photographic film material at a given focal plane, said camera comprising:

a blade mechanism;

means for mounting said blade mechanism for displacement between a first arrangement wherein it precludes scene light from reaching the film plane and a second arrangement wherein it defines a maximum size aperture, said blade mechanism serving to define a range of progressively increasing sized apertures for admitting scene light to the film plane as it is moved from its said first arrangement to its said second arrangement, said mounting means additionally including a mounting member pivotally disposed for rotation about a first axis, said mounting member also connecting to said blade mechanism so as to pivot in one direction when said blade mechanism is moved from its said first arrangement toward its said second arrangement and to pivot in the direction opposite to said one direction when said blade mechanism is moved from its said second arrangement toward its said first arrangement;

selectively actuable drive means for moving said mounting member and said blade mechanism between its said first and second arrangements;

an inertial member disposed for rotation about a second axis parallel to said first axis and including a portion engagable by said mounting member so as to be rotated from an initial position by said mounting member as said mounting member rotates in its said one direction thereby imparting a slower aperture opening movement to said blade mechanism than would otherwise occur as said mechanism is moved from its said first arrangement toward its said second arrangement by said drive means, said inertial member being further configured not to engage said mounting member as said mounting member is rotated in its said other direction thereby accommodating an aperture closing movement of said blade mechanism by said drive means substantially unrestricted by the inertia characteristic of said inertial member; and a spring element arranged to be engaged in a tightened condition solely by said inertia member as said mounting member is moved in its said one direction in order not to influence the aperture opening movement of said blade mechanism as said blade mechanism is moved from its said first arrangement toward its said second arrangement by said drive means, said spring element having one end thereof disposed in position to be engaged by said mounting member as said mounting member is moved in its said other direction so as to be further tightened by said mounting member to thereby rotate said inertia member back to its said initial position after said blade mechanism is returned to its said first arrangement by said drive means.

2. The camera of claim 1 wherein said blade mechanism includes at least two blade elements having respective apertures therethrough movable along a predetermined path and said mounting member interconnects at least two of said blade elements for movement in correspondence with each other such that rotation of said mounting member in said one direction operates to simultaneously move said blade apertures into overlapping relation with each other to define said range of progressively increasing sized apertures.

3. The camera of claim 2 wherein rotation of said mounting member in its said one direction operates to impart a rotation to said inertial member in a direction opposite to said one direction and wherein said rotation of said inertial member back toward its said initial position by said spring element is in a direction opposite to said other direction of rotation of said mounting member.

4. The camera of claim 2 including means for engaging said inertial member so as to stop the rotation thereof by said mounting member at a select location corresponding to said second arrangement of said blade mechanism.

5. The camera of claim 4 wherein said engaging means includes an abutment surface fixedly positioned in the locus of rotation of said inertial member so as to engage a portion thereof when said inertial member is rotated into said select location.

6. The camera of claim 2 wherein said inertial member is generally disc shaped having an arcuate slot therethrough, and wherein there are further included means extending through said arcuate slot in cooperative engagement with at least a side portion of said inertial member for inhibiting movement of said inertial member along its axis of rotation.

7. The camera of claim 6 wherein said axial movement inhibiting means includes an arm portion extending through said arcuate slot connecting to a tab portion which overlaps the edges of said arcuate slot during normal operation, one portion of said arcuate slot being widened to accommodate the insertion of said tab portion therethrough at a location along said arcuate slot which said tab portion does not overlap during normal operation of said camera.

8. The photographic camera of claim 2 wherein said mounting member includes a drive pin extending outward from the side thereof and said inertial member includes a radially extending cam surface drivingly engaged by said drive pin as said mounting member rotates in its said one direction thereby providing a varying inertia characteristic to said blade mechanism as it moves from its said first arrangement toward its said second arrangement, said mounting member pin operating to engage said spring element and further tighten said spring element as said mounting member rotates in its said other direction.

9. The camera apparatus of claim 8 wherein said inertial member is generally disc shaped and said cam surface comprises an edge of a cutaway portion of said disc.

10. The camera apparatus of claim 1 wherein said selectively actuable drive means includes an opening drive spring for yieldably urging said blade mechanism from its said first arrangement toward its said second arrangement, and a solenoid which when energized overcomes the yieldable bias of said opening drive spring to drive said blade mechanism back from its said second arrangement toward its said first arrangement in a manner substantially unrestricted by said inertial member spring element as it tightens.

11. The camera apparatus of claim 1 wherein said spring element is a torsion spring disposed for general coaxial rotation with respect to said inertial member and including two radially extending leg portions engaged by said inertial member driving rotation thereof when said blade mechanism is moved from its said first arrangement toward its said second arrangement, one of said leg portions being engageable by said rotatable member so as to further tighten said spring element as said blade mechanism is moved from its said second arrangement back to its said first arrangement.

* * * * *